United States Patent [19]
Lancaster, Patrick R. et al.

[11] 4,387,548
[45] * Jun. 14, 1983

[54] POWER ASSISTED ROLLER-STRETCH WRAPPING PROCESS

[75] Inventors: Lancaster, Patrick R., Anchorage; William G. Lancaster, Louisville, both of Ky.

[73] Assignee: Lantech, Inc., Louisville, Ky.

[*] Notice: The portion of the term of this patent subsequent to Dec. 1, 1998, has been disclaimed.

[21] Appl. No.: 184,787

[22] Filed: Sep. 8, 1980

Related U.S. Application Data

[63] Continuation-in-part of Ser. No. 96,384, Nov. 21, 1979, Pat. No. 4,302,920.

[51] Int. Cl.³ .............................................. B65B 11/04
[52] U.S. Cl. ..................................... 53/399; 53/441; 53/465
[58] Field of Search ................. 53/399, 441, 465, 556, 53/587, 588, 210, 211; 264/288.4, 288.8, 290.5, 290.7; 28/245; 26/71

[56] References Cited

U.S. PATENT DOCUMENTS

| | | | |
|---|---|---|---|
| 2,054,603 | 9/1936 | Leaver, Jr. | 100/31 |
| 2,124,770 | 7/1938 | Evans | 100/31 |
| 2,330,629 | 9/1943 | Schmidt | 100/31 |
| 2,630,751 | 3/1953 | Cranston et al. | 100/27 |
| 2,743,562 | 5/1956 | Dawson et al. | 53/588 |
| 2,854,697 | 10/1958 | Ryan . | |
| 2,914,893 | 12/1959 | Berst | 53/556 X |
| 3,003,297 | 10/1961 | Broadhead et al. | 53/588 |
| 3,104,937 | 9/1963 | Wyckoff . | |
| 3,207,060 | 9/1965 | Smith | 100/27 |
| 3,309,839 | 3/1967 | Lyon | 53/588 |
| 3,324,789 | 6/1967 | Buettner | 100/27 |
| 3,331,312 | 7/1967 | Leslie et al. | 100/28 |
| 3,351,697 | 11/1967 | Hufnagel . | |
| 3,514,920 | 6/1970 | Hoffler et al. . | |
| 3,589,091 | 6/1971 | Cloud | 53/556 X |
| 3,590,549 | 6/1971 | Zelnick . | |
| 3,626,654 | 12/1971 | Hoffler et al. | 53/465 |
| 3,672,116 | 6/1972 | Ingmarson | 53/556 X |
| 3,788,199 | 1/1974 | Sato et al. . | |
| 3,793,798 | 2/1974 | Lancaster et al. | 53/588 |
| 3,820,451 | 6/1974 | Tanaka | 100/27 |
| 3,863,425 | 2/1975 | Edwards et al. | 53/211 |
| 3,867,806 | 2/1975 | Lancaster et al. | 53/441 |
| 4,077,179 | 3/1978 | Lancaster et al. | 53/211 |
| 4,116,892 | 9/1978 | Schwartz | 264/288.8 |
| 4,136,501 | 1/1979 | Connolly | 53/461 |
| 4,302,920 | 12/1981 | Lancaster | 53/556 X |

FOREIGN PATENT DOCUMENTS 2281275 8/1974 France .
1013980 12/1965 United Kingdom .

*Primary Examiner*—John Sipos
*Attorney, Agent, or Firm*—Gipple & Hale

[57] ABSTRACT

A process and apparatus for pre-stretching a plastic film material above its yield point in a roller assembly comprising at least two rollers connected for rotation at different speeds during a load wrapping operation. The downstream roller is at least partially driven by the film web connected to a turntable while the upstream roller rotates at a predetermined speed slower than that of the downstream roller to induce film elongation between the rollers. The force on the film between the roller assembly and the load is reduced by a powered constant torque device connected to the rollers to bring the force to the load down to a level permitting the film elongation between the roller assembly and the load to be equal to (balanced) or less than the elongation incurred between the rollers. The force from the torque device required to bring elongation on the load in balance with the elongation between the rollers will be equal to the difference between the force required to elongate the film between closely spaced rollers and the force required to hold the elongation after the film leaves the rollers corrected for the mechanical advantage and friction of the pre-stretch device. Since the film has been stretched above its yield point, the relieving of stress from the film between the rollers and the load allows the film to retain a high degree of pre-stretch elongation.

18 Claims, 33 Drawing Figures

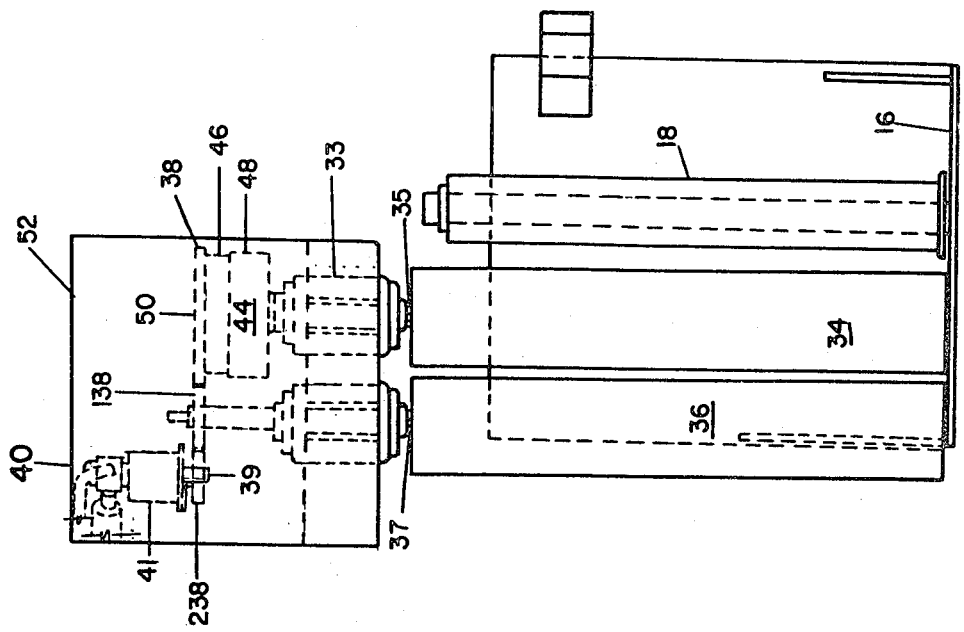
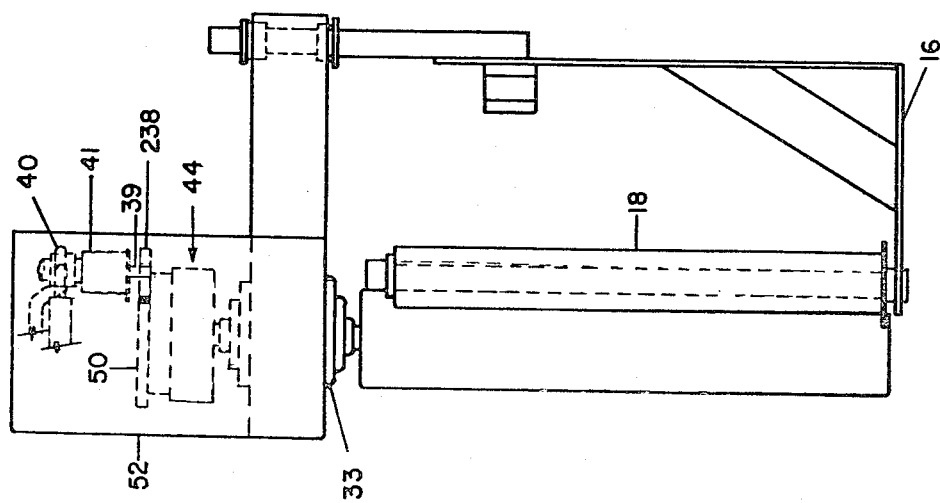

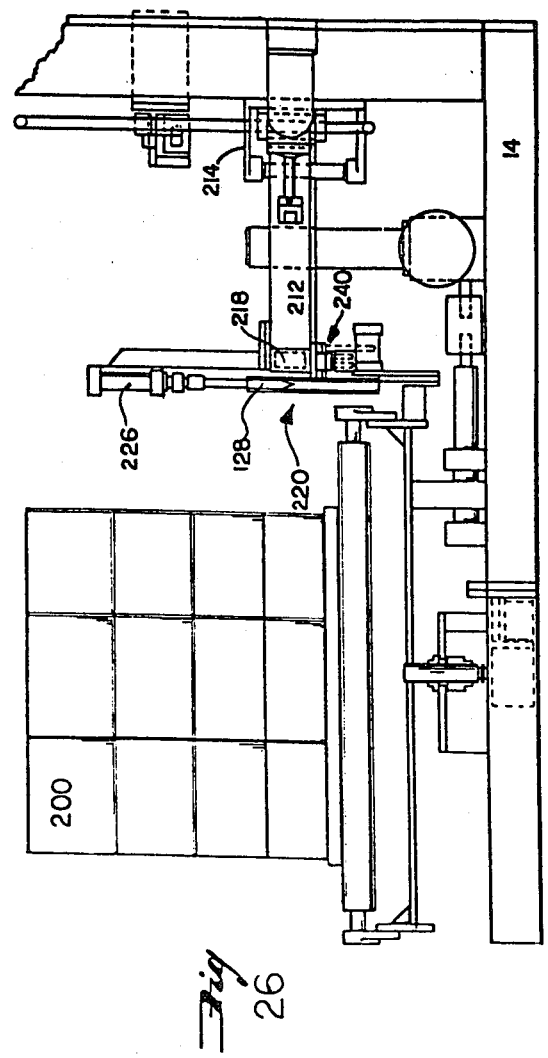

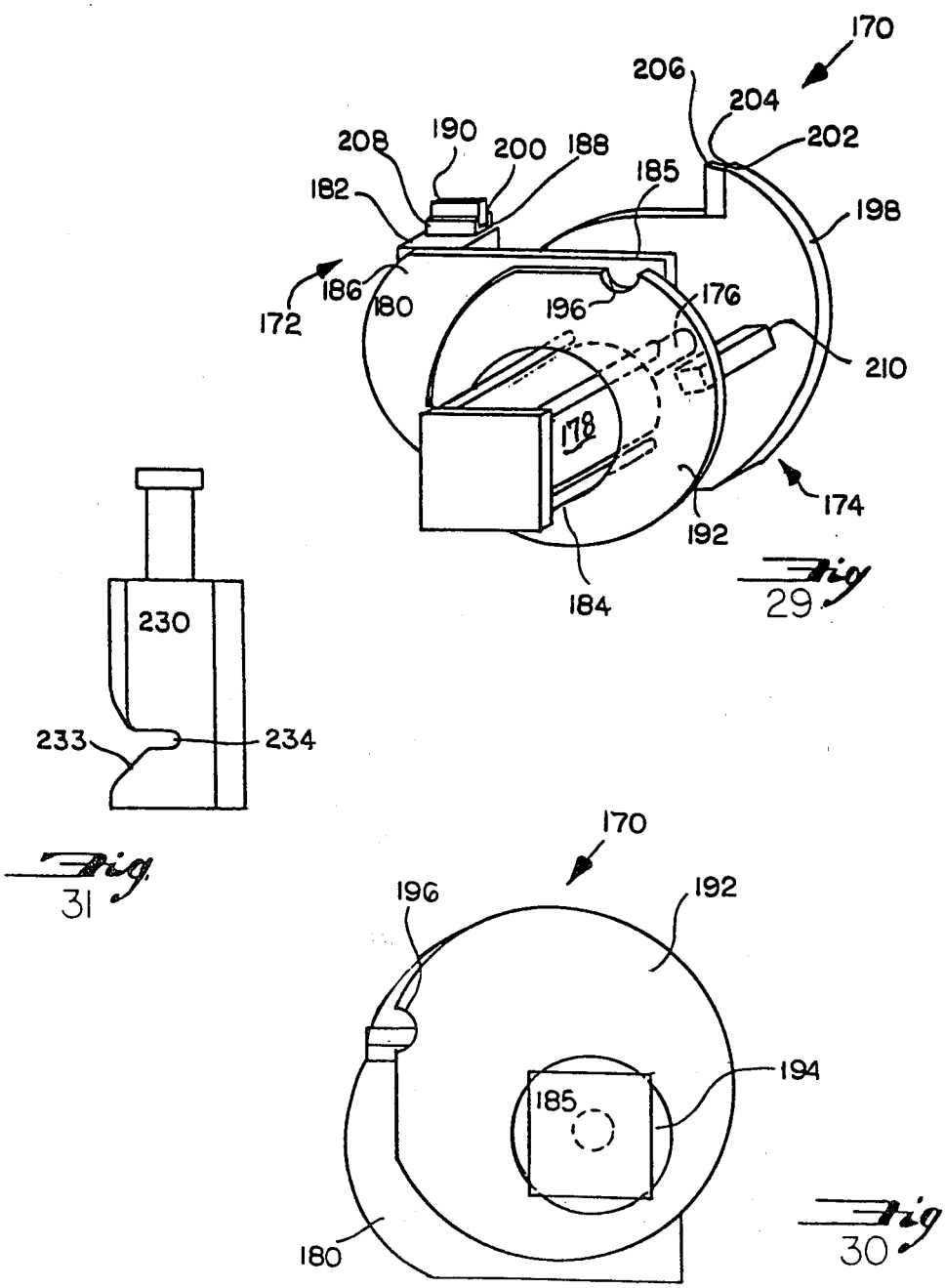

POWER ASSISTED ROLLER-STRETCH WRAPPING PROCESS

RELATED APPLICATION

This application is a continuation-in-part application of Ser. No. 096,384 filed Nov. 21, 1979 now U.S. Pat. No. 4,302,920.

BACKGROUND OF THE INVENTION

The present invention generally relates to packaging and more particularly to an apparatus and method for making unitary packages which hold a plurality of components, each package containing a load wrapped in a web of stretched film.

Case packing or boxing is a common way of shipping multiple unit products. The multiple unit products are generally stacked in a corrugated box or are wrapped with kraft paper with the ends of the kraft paper being glued or taped. Another way of shipping such products is by putting a sleeve or covering of heat shrinkable film around the products and shrinking the sleeve to form a unitized package. The use of heat shrinkable film is described in U.S. Pat. Nos. 3,793,798; 3,626,645; 3,590,509; and 3,514,920. A discussion of this art is set forth in U.S. Pat. No. 3,867,806.

Another common method of wrapping loads is with rotary stretch wrapping machines. These rotary machines are commonly referred to as spiral or full-web machines, and can operate with the load rotating to pull stretched film web around it. Alternatively, the load can be stationary and stretched film wrapped around the load with a rotating film dispenser.

A typical state-of-the-art full-web apparatus is disclosed in U.S. Pat. No. 3,867,806.

The use of spiral wrapping machinery is well known in the art and representative machines are typified by U.S. Pat. Nos. 3,003,297; 3,788,199; 3,683,425; and 4,136,501.

Additional references of interest which are pertinent to rotatable drives for wrapping packages are disclosed in U.S. Pat. Nos. 3,820,451; 3,331,312; 3,324,789; 3,309,839; 3,207,060; 2,743,562; 2,630,751; 2,330,629; 2,054,603 and 2,124,770.

The film stretching means on all currently marketed pallet stretch wrapping devices employ either direct or indirect friction to restrict the film as it is being wound onto the load during the wrapping process. The restriction is either applied to the roll of film itself (direct friction) or applied to the film after it is unwound from the film roll (indirect friction). The pallet and load serve as the winding mandrel providing all of the pulling force required to elongate the film.

The earliest type of stretch wrapper utilized a direct friction device in the form of a brake that is connected to the film roll through the core as shown in FIG. 1. The torque from the frictional brake device acted on the center of the film roll and as the roll changed diameter, the voltage to the brake was altered, either by the operator or automatically by a sensing device. A later film roll brake device, illustrated by U.S. Pat. No. 4,077,179, and FIG. 2 herein, utilizes a frictional brake attached to a shaft with a roller which is pressed against the freely mounted film roll. The film roll brake eliminates the need to change the brake force during the consumption of the film roll.

Various prior art indirect friction film stretching devices have been employed to restrict the film as it is wound onto the pallet during the wrapping process. One of these devices, commonly referred to as an "S" type roller device, is shown in FIG. 3, and utilizes an idle roller followed by a braked roller over which the film is threaded prior to wrapping the load. The function of the two rollers is to align the film for maximum contact with the braked roller. Another indirect friction device having fixed bars was marketed by Radient Engineering Corporation under the trade name POS-A-TENSIONER and has been subsequently marketed by the Kaufman Company under the trade name TNT. This device, shown in FIG. 4, has a series of fixed, non-rotating bars positioned adjacent to the film roll. The film web is threaded around the bars whose relative angles can be changed for ultimate tensioning. As the film web is attached to the pallet it is drawn across the bars and the friction between the film and the smooth surface of the bars provides a restriction causing the film to stretch. This device uses multiple bars with the film web stretching incrementally between each other. Neck down of the film web increases between each bar and the load bears the force. As the load rotates, the wrap angle changes from the last bar so that the wrapping force greatly varies depending on the relative angles. The frictional restraint is determined by the vector of the film web on each bar. Thus, the device is very sensitive to the force placed on the unwind roll and the force increases as the roll size decreases adding additional force on the system. Furthermore, there must be some friction placed on the supply roll to prevent backlash. While this device solves to some degree the irregularities of the brake and the hostility of the film roll, it can only apply limited stretch to the load and does not handle different film compositions with any degree of standardization.

Another stretch wrapper device was introduced by the Anderson Company at the PMMI Show in Chicago in 1978. This device interconnected the turntable drive motor with a pair of nip rollers immediately downstream from the film unwind roll, as shown in FIG. 5. The nip rollers were synchronously driven with the turntable rotation through a variable transmission which could be increased or decreased in speed relative to the turntable rotation speed. Thus the stretch on the film was affected between the constant-speed nip rollers and the pallet turning. It is not known if this machine was ever commercialized, principally because of its inability to achieve satisfactory stretch over the load corners due to its failure to respond to the speed change that these corners represented. The pallet, as the film accumulating mandrel, provided the total force that was required to stretch the film from the driven nip rollers with all of the stretch occuring after the passage of the single pair of nip rollers to the pallet.

In addition to the previously noted prior art, direct friction pallet stretch wrapping machines of the pass through type have been manufactured by Weldotron and Arenco (Model No. MIPAC). These machines have a significant problem in stretching the film and normally stretch film around the load in the range of about five to ten percent. These machines depend on being able to drive the pallet and associated load through a stretched curtain of film to place the stretching force on the front or sides of the load.

Since most pallet loads will not hold together while being subjected to these unequal forces, the film web is normally tensioned after the film seal jaws begin their inward travel over the end of the pallet load. This form of tensioning severely limits the degree of elongation of film which is able to be achieved and pulls excess film around the two rear corners of the load while the jaws are closing. This frequently causes film tears when the film is stretched more than ten percent.

When low stretch rates of one to ten percent are produced, several packaging problems occur. The unitizing containment forces on the load are less than the optimum force which can be obtained. This minimizing of containment forces can result in a potential loosening of the film wrap during shipment where the load settles and moves together thereby reducing the girth.

Another pass through machine described by French Pat. No. 2,281,275 assigned to SAT discloses the prestretching of plastic film by taking the film web from the film roll through a powered roller system having a speed differential of $V_2-V_1$ which stretches the film. The film leaving the second set of rollers is drawn off at a speed which is equal to or less than $V_2$ as it is wrapped around the load. V, which is the speed of rotation of the pallet load, is less than or equal to $V_2$, the speed of the stretched film coming off of the second roller assembly.

Although the French Patent appears to achieve film web stretch in excess of the one to ten percent range obtained in the aforementioned pass through stretch wrapping machines, other problems remain. The system requires manual operation or complex automatic feedback to accommodate the change in film take-up speed as the pallet load surfaces pass by the downstream rollers. This reference does not teach the benefit of stretching the film above the yield point with increased strength per cross-sectional area and increase in modulus. There is furthermore no teaching of reducing the force on the portion of the film web between the downstream powered rollers and the load with inelastic strain recovery as a technique for reducing wrapping force while holding high levels of elongation.

A commercial model based on FIG. 8 of the '275 reference is currently being marketed by SAT. In this embodiment the film web is pre-stretched by extending a pair of rollers forward while braking the film rolls. The load is carried into the pre-stretched "U" shaped sleeve and the rollers are transported back of the load allowing the sleeve to engage the load. Sealer bars are then projected inward to seal the web ends together.

The aforementioned stretching devices do not maintain a consistent force in stretching the film web. These brake devices are subject to variation due to their physical construction and their sensitivity to speed change caused by passage of corners of the load and the resultant sudden speed-up and slow-down of film drawn from the feed roll.

The elasticity of the stretched plastic film holds the products of the load under more tension than either the shrink wrap or the kraft wrap, particularly with products which settle when packaged. The effectiveness of stretch plastic film in holding a load together is a function of the containment or stretch force being placed on the load and the ultimate strength of the total layered film wrap. These two functions are determined by the modulus or hardness of the film after stretch has taken place and the ultimate strength of the film after application. Containment force is currently achieved by maximizing elongation until just below a critical point where breaking of the film occurs. Virtually all stretch films on the market today including products of Mobil Chemical Company (Mobil-X, Mobil-C and Mobil-H), Borden Resinite Division PS-26, Consolidated Thermoplastics, Presto, PPD and others are consistently stretched less than thirty percent in most commercial applications despite a manufacturer's laboratory rated capacity in excess of three hundred percent in most cases.

This problem of obtaining less stretch on commercial wrapping than that available under laboratory conditions centers on several facts. A square or rectangular pallet which is typically positioned off of its center of rotation is used as the wind up mandrel for the purpose of stretching film. A typical 40"×48" pallet positioned 3 to 4 inches off of its center of rotation will experience a speed change of up to 60% within one quarter revolution of the turntable.

In this regard, FIGS. 16 through 21 illustrate the manner in which constant rotation of a palletized load placed slightly off center on a turntable will result in significant variations in tension on the film web being wrapped around the load. Since the turntable rotates at a constant angular speed, the film web is drawn to and around the rotating pallet load at a speed which is determined by the distance between the axis of rotation and the point at which the web contacts the load. The axis of rotation in each of the illustrations is at point A and the distance between the axis and the film contact point is illustrated by an arrow B. The axis of rotation A is offset slightly from the true geometric axis C of the palletized load. It can thus be seen that as the load is rotated in a clockwise direction, the distance from the axis of rotation A to the film web contact point remains constant in FIGS. 16 through 19. However, as the load is rotated from the position shown in FIG. 19 to its position shown in FIG. 20, the distance between the axis of rotation and the film contact point increases markedly, thus increasing the speed at which the film is drawn from the roller and the force between the downstream stretch roller and the pallet load.

In addition to the off centering problem most pallet loads are irregular in shape with vertical profiles which produce a significant puncture hazard to highly stretched film being wound around them. Further, some unit loads are very susceptible to crushing forces of the stretched film. Because of pallet load changes and inconsistencies within the film roll, the operator typically continues to reduce the tension settings until there are no failures. Thus the inconsistencies of films, stretching devices, and pallet loads produce an environment where very few stretch films are actually stretched to their optimum yield.

The major problems with current stretch technology are that stretch is produced by frictional force devices to restrict the film travel between two relatively hostile bodies. On the one hand the film roll is subject to edge wandering and feathering, while on the other hand the rotating pallet with its irregular edges and rapidly changing wind-up speeds severely limits the level of elongation achieved. The ultimate holding forces of the film cannot be brought to bear on the load because the film cannot be stretched enough. Even if the film could be stretched enough the high wrapping forces can disrupt or crush many unit loads. The use of high modulus films, such as oriented films, does not produce the yield benefits of the current invention, since these higher modulus films would have to be significantly stretched in order to achieve the rubberband effect and moldability required for irregular loads.

It therefore can be understood, since the pallet provides the forces for stretching the film, that stretch percentages achieved on the pallet and the stretch force achieved are intertwined in all prior art devices. As previously indicated, high stretch percentages are required to achieve the benefits of high yield but the high stretch forces incurred at these high stretch percentages cause premature film rupture and potential crushing of the load.

In an attempt to solve the aforementioned problems several other devices have been developed by the present inventors.

One device called the powered stretch embodiment stretches the film web above its yield point between two sets of powered rollers prior to transporting the film to the pallet, increasing its modulus while reducing its cross-sectional area.

Since the film stretches between the rollers, all stretching action is isolated from the roll and the pallet. It also removes the dependence of the stretch force and elongation level. While the device can be used to wrap light or crushable loads it has several problems in actual use. The controls necessary to compensate for the interacting speed changes are very complex and prohibitively expensive. Thus, the device generally will require feedback controls to sense force change and maintain the force level.

Another known device manufactured by Lantech Inc., under the trademark "ROLLER STRETCH" utilizes the film web to drive the apparatus. This device addresses several of the aforementioned problems. Since the film is pre-stretched between the rollers, it isolates the stretching action from between the film roll and the pallet. This device provides a consistent level of stretch and, most importantly, responds to force and speed changes without complex feedback controls as can readily be seen in the graph of FIG. 21. A problem inherent with the ROLLER STRETCH device is that it has a dependence between the percentage of stretch that can be achieved and the stretch force that will be required to elongate the film. It should be noted that although these two factors are connected, the film web drive device significantly lowers the stretch force for a given elongation level, at or below the balance point as is seen by FIG. 22. This is due to the mechanical advantage between the film driven rollers.

Balance is achieved when elongation between the rollers ($E_1$) is equal to elongation on the load ($E_2$). The relatively higher forces between the closely spaced rollers are overcome by the lower force required to drive the device by the film between the roll and the load. The stress/strain curve experienced between closely spaced rollers is substantially higher than the curve where film is allowed to expend the pulling force. Thus, the film to the load affects this higher force between the rollers aided by the mechanical advantage of the differential pulley relationship of the gear connected rollers. At balance point 414 the elongation on the load ($E_2$) equals elongation between the rollers ($E_1$) and the mechanical advantage represents the differences between the forces corrected for friction. This limits the film drive device to an elongation level on most films of under 120 percent elongation between the rollers.

It is therefore apparent that there exists a need for a pallet load wrapping apparatus which reduces or eliminates the dependence between the percentage of stretch that can be achieved and the force that will be required to drive the pre-stretch device.

SUMMARY OF THE INVENTION

The present invention comprises a pallet load wrapping apparatus with an improved stretching assembly for stretching the film web prior to wrapping the web about the load. The film passes between rollers in the stretching assembly configured for optimum film surface friction to avoid slippage. The rollers are interconnected by a gear or other speed ratio means, so that the wrapping of the film around the load will drive a downstream roller interconnected to an upstream roller at a ratio pre-selected for optimum stretch of the particular film composition. The entire roller means may be mounted for movement along a horizontal axis so that the upstream roller can be urged against the film roll to interconnect the upstream roller by friction, thus avoiding backlash while maintaining very low friction on the unwind shaft. A positive torque means is connected by a spur gear or other means to the downstream roller to provide some portion of the force that is required to operate the stretching assembly. Thus, the force placed on the film web between the downstream roller and the pallet can be reduced to the optimum level. Since it is the interconnection by the film to the turntable which is driving the stretching assembly, speed changes on the load surfaces are transmitted back to the upstream roller, speeding up and slowing down the rollers as necessary in order to keep a relatively constant force and stretch level.

Film elongation may be achieved in the present invention, in excess of three hundred percent offering significant economies in film costs during operation, without damage to delicate loads and the destructive uneven stresses on the film web which are recognized as prevalent deficiencies in the prior art. High elongation levels have been found to significantly increase ultimate film strength when elongation occurs between closely spaced rollers where neck down can be virtually eliminated. Tests have indicated that ultimate strength of Mobil-X and Bemis ST-80 increases over twenty percent after having been elongated one hundred and forty percent between two rollers spaced one half inch apart. This strength increase is in addition to the increase in strength per cross-sectional area. Thus, the invention provides for a consistent force wrap with a higher wrap yield per pound of plastic. The wrap has a high resistance to load shift with low neck down during wrapping and no stress relaxation of the wrap on many films. The invention has the ability to wrap light or crushable loads and irregular loads which may require additional reduction of the wrapping force.

These and other objects and advantages of the present invention will be more readily apparent when read in conjunction with the following detailed description of the preferred embodiment of the invention.

BRIEF DESCRIPTION OF THE DRAWINGS

FIG. 9 is an enlarged isolated side elevational view of the film stretching assembly of the invention;

FIG. 10 is an front elevational view of the film stretching assembly shown in FIG. 9;

FIG. 26 is a partial side elevational view of a roping and tying assembly used with the invention;

FIG. 29 is an enlarged isolated perspective view of the clamping assembly of the roping mechanism in an open position;

FIG. 30 is a side elevational view of the clamping assembly of FIG. 28;

FIG. 31 is a side elevational view of the cutter mechanism housing;

DETAILED DESCRIPTION OF THE DRAWINGS

Figure 13:
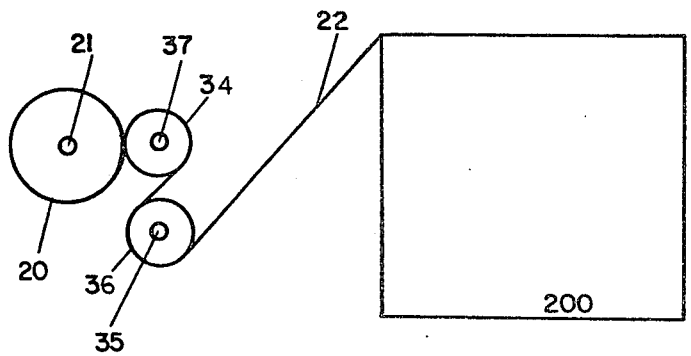
FIG. 13 is an isolated schematic top plan view of the inventive apparatus including the film web and load.
Figure 12:
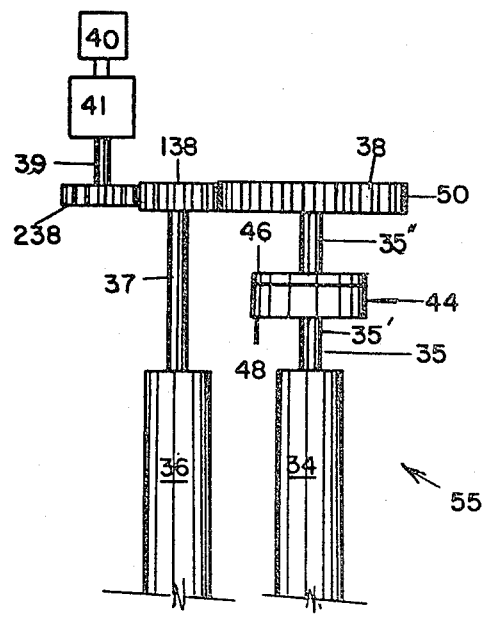
FIG. 12 is an isolated partial front elevational view with casing removed of the film stretching assembly of the present invention.
Figure 1:
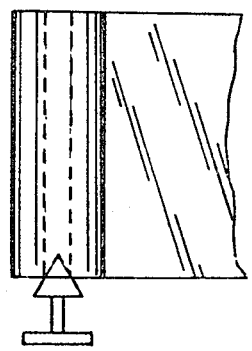
FIG. 1 is a side elevational view of a prior art core braking mechanism engaged with a film supply roll.
Figure 2:
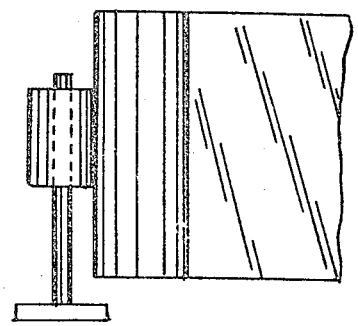
FIG. 2 is an isolated side elevational view of prior art roller braking mechanism engaged with a film supply roll.
Figure 14:
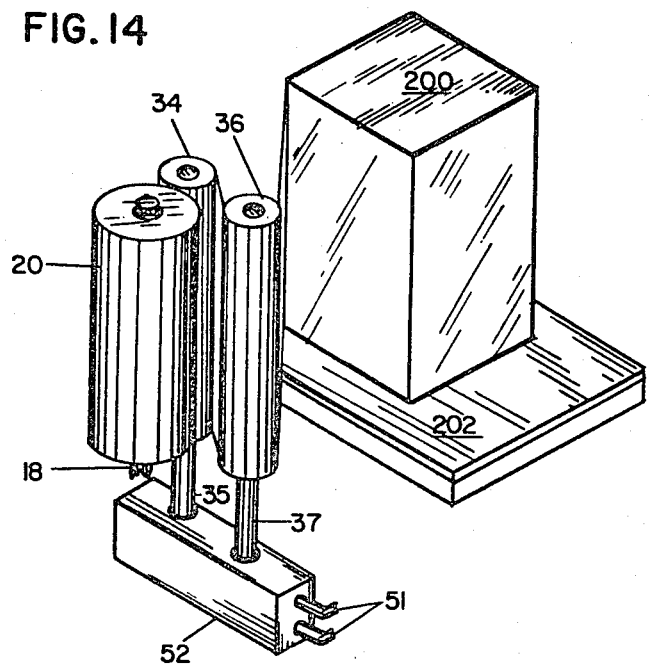
FIG. 14 is an elevated perspective view of the apparatus in FIG. 13.
Figure 4:
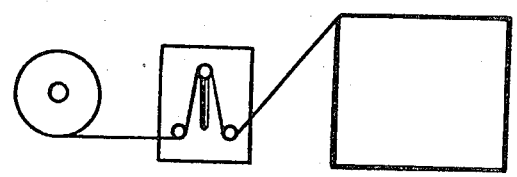
FIG. 4 is an isolated top plan view of friction bar prior art stretch wrapping apparatus.
Figure 5:
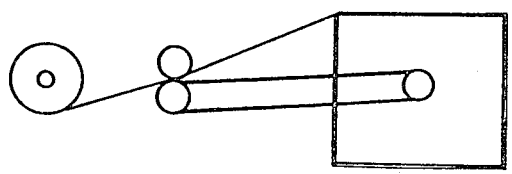
FIG. 5 is an isolated top plan view of a turntable driven nip roller prior art stretch wrapping apparatus.
Figure 3:
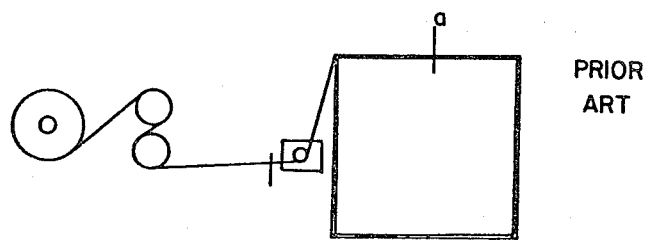
FIG. 3 is an isolated top plan view of an "S" configuration prior art stretch wrapping apparatus.
Figure 7:
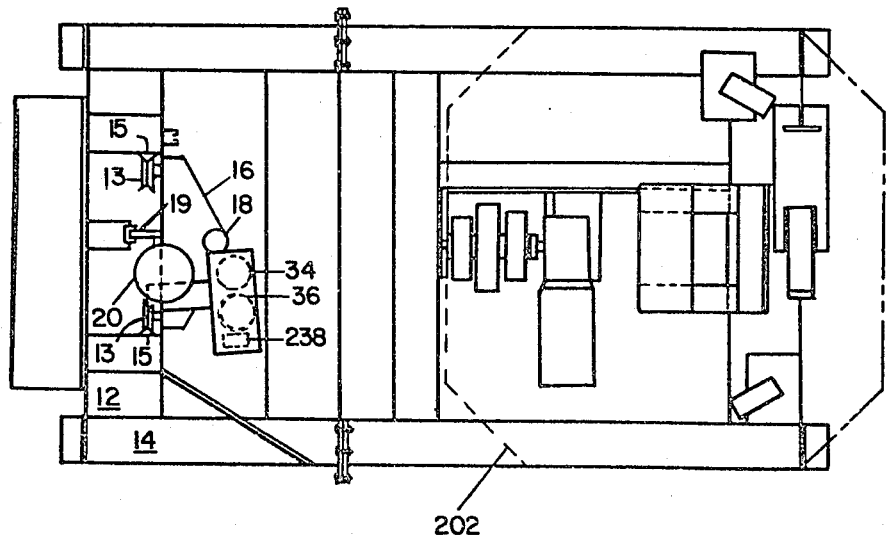
FIG. 7 is a top plan view of the apparatus shown in FIG. 6.

The inventive wrapping apparatus 10 is shown in FIGS. 6 through 34, with the preferred embodiment and best mode of the invention being shown in FIGS. 6 through 14. The operation and description of the apparatus and its respective component parts is discussed in the following description.

The film web driven stretch wrapping apparatus 10 comprises an upright frame 12 sitting on a base 14. In the preferred embodiment and best mode of the invention, a carriage 16 is movably mounted on the frame 12 by means of rollers 13 rotatably mounted on tracks 15 secured to the frame. The carriage has a motor 17 mounted on it to provide the power for a rack and pinion drive 19. However, chain or other suitable drive means can be used. These drive means are well known in the art and are typified by machine Model Nos. SVS-80, SVSM-80, STVS-80, STVSM-80 and SAHS-80 manufactured by Lantech Inc. The apparatus 10 may also be a full-web apparatus with the carriage removed as is well known in the art. Such machines are typified by machine Model Nos. S-65, SV-65 and SAH-70 manufactured by Lantech Inc. A typical state-of-the-art full-web machine is also disclosed in U.S. Pat. No. 3,867,806.

Figure 11:
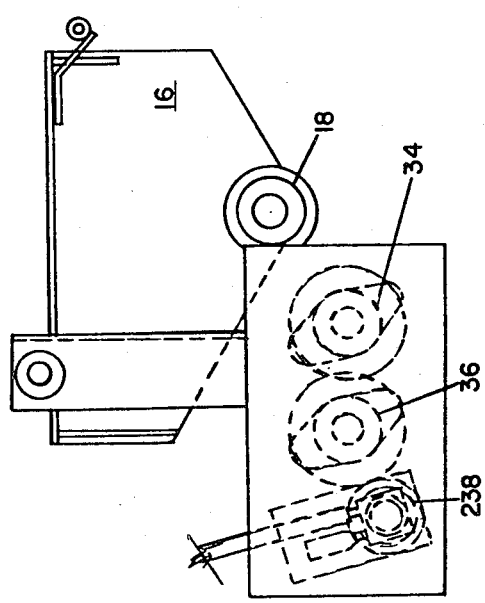
FIG. 11 is a top plan view of the film stretching assembly shown in FIG. 9.
Figure 8:
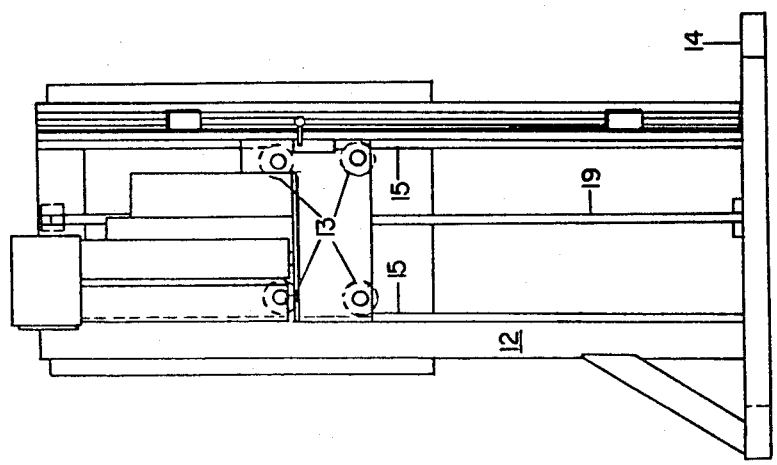
FIG. 8 is an isolated front elevational view with turntable removed of the apparatus of FIG. 6.

A film unwind stand 18 which is well known in the art is mounted on the carriage 16 or base 14 in the case of a full-web machine. The stand is constructed with sufficient drag to allow smooth film to unwind without backlashing from film roll 20 to a first roller 34 which is mechanically connected by a gear assembly 50 to a second roller 36. The rollers 34 and 36 are closely spaced together preferably in the range of ¼ inch to 2 inches, geared for reverse rotation, and are rubber faced for maximum film contact. This close relationship of the rollers prevents significant neckdown of the film with the stress/strain curve on the film being substantially higher than the curve where film is allowed to freely neck down during stretching. As is seen in FIGS. 9 through 11, the rollers are connected by a gear assembly 50, but it should be noted that they could alternatively be connected by chains, belts or other mechanisms (not shown). Since most films, except linear low density polyethylene, reach their yield point before thirty percent elongation, the gear speed relationship should be variable from thirty percent to three hundred percent to allow use on all stretch films which are currently available in the marketplace.

EVA copolymer films of high EVA content such as the film manufactured by Consolidated Thermoplastics "RS-50", and PPD "Stay-Tight" are preferably pre-stretched from one hundred thirty percent. PVC films such as Borden Resinite "PS-26" are best pre-stretched at levels of forty percent. Premium films such as Mobil-X, Presto SG-4, Bemis ST-80 and St. Regis utilize a new low pressure polymerization process resin manufactured by Union Carbide and Dow Chemical Company. This resin, called linear low density polyethylene, has significantly different stretch characteristics than previous stretch films. These characteristics allow the film to withstand the high stress of over two hundred fifty percent elongation during pre-stretch without tearing during wrapping of the pallet. In the preferred embodiment of the invention, as shown in FIGS. 6 through 14, rollers 34 and 36 are respectively secured to rotatable shafts 35 and 37 which are in turn mounted in respective journals or bearings 33 mounted to the gear housing 52 and carriage 16.

A gear 38 is mounted on shaft 35 and is rotated by the film web 22 driving roller 34. A clutch assembly 44 is also mounted to shaft 35. The clutch assembly is an over-the-counter Warner friction brake PC-500. A clutch plate 46 is mounted to the end of shaft portion 35" opposite the face of the clutch member 48 secured to the end of shaft portion 35'. When the clutch is operative, pins (not shown) interconnect the clutch plate 46 with the gear 38 engaging the gear member 38 so that it rotates simultaneously with roller 34. When the clutch is not operative or energized, the roller 34 freewheels or turns without relationship to gear 38 thus allowing a film web to be easily threaded through the roller assembly and attached to the load. The use of such clutching mechanisms is well known in the art. Gear 38 is adapted to engage and mesh with an opposing gear 138 mounted on shaft 37. The interconnection of the gears is such that haul off of the film web by the load will drive the downstream gear 138 through interconnected rollers 34 and 36 at a pre-selected ratio for the optimum stretch for the particular film used.

The entire roller assembly 55 can be mounted for movement on a horizontal axis so that the upstream roller 34 can be urged against the film roll to engage the upstream roller by friction to the roll unwind to avoid backlash while maintaining very low friction on the unwind shaft.

Opposing gear 138 is further adapted to engage and mesh with a spur gear 238. The spur gear 238 is mounted to a shaft 39 of a standard gear reduction assembly 41 which is connected to an air powered positive torque device 40. The positive torque device 40 when powered by a selected air pressure drives the downstream gear 138 through spur gear 238 to reduce the forces on the film web while the film is being stretched. The interconnection of the positive torque device 40 provides a portion of the force that is required to rotate rollers 34 and 36 and their associated gears 38 and 138. Thus the force placed on the film, between the stretching assembly and the pallet can be reduced to an optimum level. The winding force required on the part of the rotating pallet is less than it otherwise would be. The function of the torque device 40 is therefore analogous to power steering in an automobile. Thus the effort required on the part of the rotating pallet is less than it otherwise would be. Preferably the force between the rollers 34 and 36 is greater than that between the downstream roller 36 and load 200. Since the positive torque device 40 drives gear 138 by adding a constant torque, rather than a constant angular rate, speed changes on the haul off of the film will be transmitted back to the rollers 34 and 36 increasing and decreasing speed in response to the changing effective diameter of the load 200 as previously discussed and shown by FIGS. 16 through 20, thus keeping a relatively constant force and stretch level. The constant torque device 40 will allow balance to be achieved at higher film elongation levels than that of the ROLLER STRETCH device which is only driven by the turntable rotated pallet load interconnected to the film web. At the point when the mechanical advantage will not overcome the difference in force between the amount to stretch the film between the rollers and that amount to hold the elongation to the load, the constant torque device becomes essential. The film Mobil-X reaches this balance point at 110% (see FIG. 22) with the ROLLER-STRETCH embodiment. Higher gear selections produce secondary stretch without torque assistance. Up to and above 250% gear selections are possible with torque assistance to overcome the higher stretch forces between the rollers. Thus, the torque assist must make up for the loss in mechanical advantage as the gear ratio is increased for higher elongation on the load. It can be seen that power assisted roller-stretch has all the advantages of power-stretch but does not require the feedback controls and has all the advantages of ROLLER-STRETCH, plus the ability to significantly increase the level of film elongation on the load.

In a working embodiment of the invention, commercial over-the-counter air motor model nos. 1AM-NRV-56-G and 1AM-NRV-60-GR11 with a 15:1 gear reducer manufactured by Gast Co. have been used as the constant positive torque device 40. However, it should be noted that other known conventional constant positive torque devices powered by electricity or other positive torque devices may be used with satisfactory results.

Figure 6:
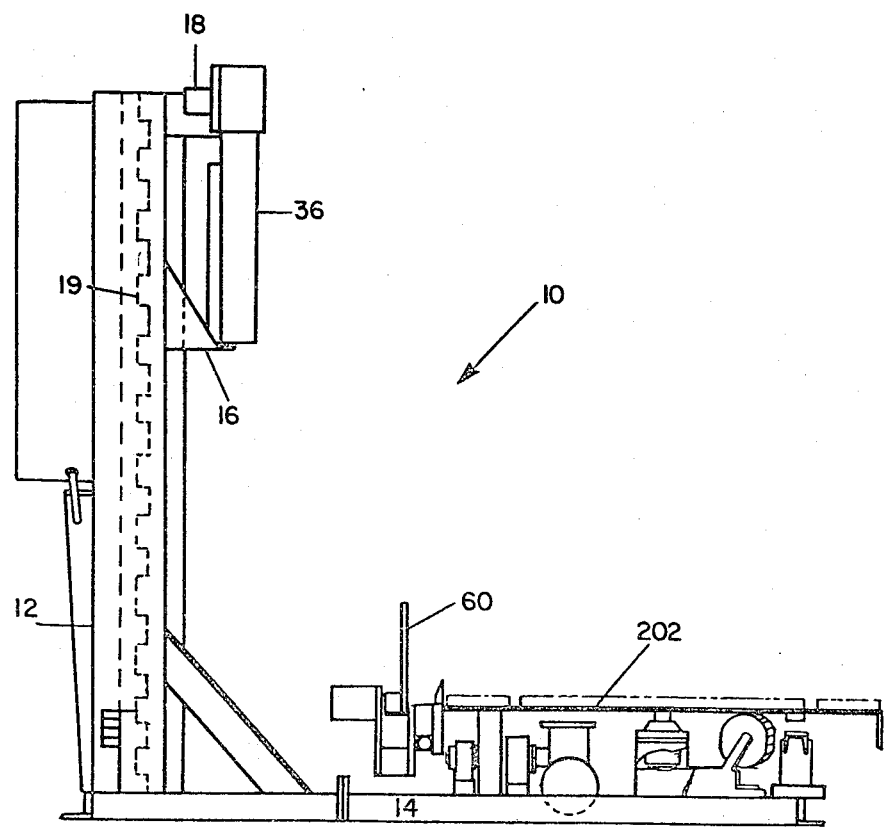
FIG. 6 is a side elevational view of the preferred embodiment of the present inventive apparatus.

In operation of the preferred embodiment as shown schematically in FIG. 13, the film web 22 is pulled from the film roll 20, threaded around the two rollers 34 and 36 which are configured for optimum film surface friction to avoid slippage and then secured to the load 200 by attachment to a clamp 60 mounted to the turntable as shown in FIG. 6, or by tucking the leading end of the film web into the load. A release system such as clutch assembly 44 shown in FIGS. 9 through 12 can be used to ease the tucking or start up for full-web or high modulus film applications. If desired, the turntable revolution can begin with the turntable clutch disengaged. After passage of at least one corner of the load, the clutch is engaged to connect the gears and rollers to each other at the predetermined gear ratio. Typical gear selections which have been used with the following films are: Mobil-X 250 percent; EVA 150 percent; and LDPE 70 percent. As the turntable 202 rotates, the film web 22 is pulled across the first roller 34 thereby precisely increasing the speed for the second roller 36 to a predetermined ratio controlled by the gear assembly. The connection means can be a gear transmission or any other conventional speed ratio linkage system. The film is thereby precisely elongated by a percentage represented by the relative speed differential of the rollers.

Simultaneously to the engagement of the clutch the air pressure is connected to the air torque device to assist the roller assembly in stretching the film web to the level represented by the gear ratio reducing the stretch force. The torque assist must make up for the loss in mechanical advantage as the gear ratio is increased for higher elongation on the load.

Alternately, the clutch could remain engaged or be eliminated and the torque device could be pressurized upon the turntable start to relieve pressure on the tuck or clamp.

Before wrapping the load, the air pressure to the powered torque device 40 is set to the desired stretch force, namely a force which does not crush the load or distort it during the wrapping operation, up to the balance point. Typical psi of air pressure to device 40 to assist the film Mobil-X on a very regular load type A is 40 psi, a slightly irregular load type B is 60 psi and a very random and irregular load type C is 80 psi. A spiral or full-web wrap cycle is accomplished on the load in a manner known in the art. Approximately one quarter turn before completion of the last turntable revolution the clutch can be partially or completely disengaged to allow unwinding of selectively less stretched film to get it into a take-up range allowing it to be wiped on a wrap. Air pressure to the torque device is significantly reduced at the same time. This step is undertaken when a film is used which loses its tackiness when it is stretched past the yield point. One such film that behaves in this manner is Mobil-X. Cutting and sealing is performed in a standard known manner. Other films do not lose this tackiness property and can be wiped onto the load or tied to the load as is described in the specification.

One positive aspect of the inventive wrap is that the very rapid elongation of the film followed by rapid strain relief of certain films will cause a "memorization" effect. Generally, films when stretched above the yield point with the stretch force from the stretching assembly to the load reduced at least fifty percent from that force achieved within the stretching mechanism and wrapped on the load at more than 100 linear feet per minute with a dwell time between the stretching assembly and the load of less than one half second achieve significant memory. Due to this memory effect, the film will significantly increase holding force and conformation to the load. PVC films, such as PS-26 by Borden Resinite Division, demonstrate this memory capacity very significantly. As an example, a 20 inch web of Mobil-X, stretched at 250 percent and power assisted down to thirteen pounds of force, when wrapped on the load shows an increase in force over three minutes. This is the reverse of stress relaxation of over 20 percent in the first three minutes when stretched conventionally. Because of the film's memory, the film will actually continue to shrink for some time after being subjected to the high levels of stretch above the yield point and immediate reduction of force. This film characteristic as shown in graph form in FIG. 24 as compared to FIG. 23 can be used to wrap loads at very close to zero stretch wrapping force using the memory to build stretch force and load conformity. As can be noted from both graphs, when film has been assisted by 80 to 90 psi there is a substantial increase in force after three minutes as can be readily seen from the top points of the curves.

The air system positive torque device was selected because of its very low inertial mass, low weight and responsiveness to speed change without torque change. Optimum wrapping results and machine reliability were obtained while keeping the film elongation on the pallet in balance or equal to or less than the elongation incurred between the rollers. At elongations significantly above elongations achieved between the rollers, secondary stretch occurs between the stretching device and the load. This secondary stretch induces significant forces in the film which cause premature zippering of the film on any load irregularity. Furthermore, this secondary stretch increases neck down of the film.

Figure 32:
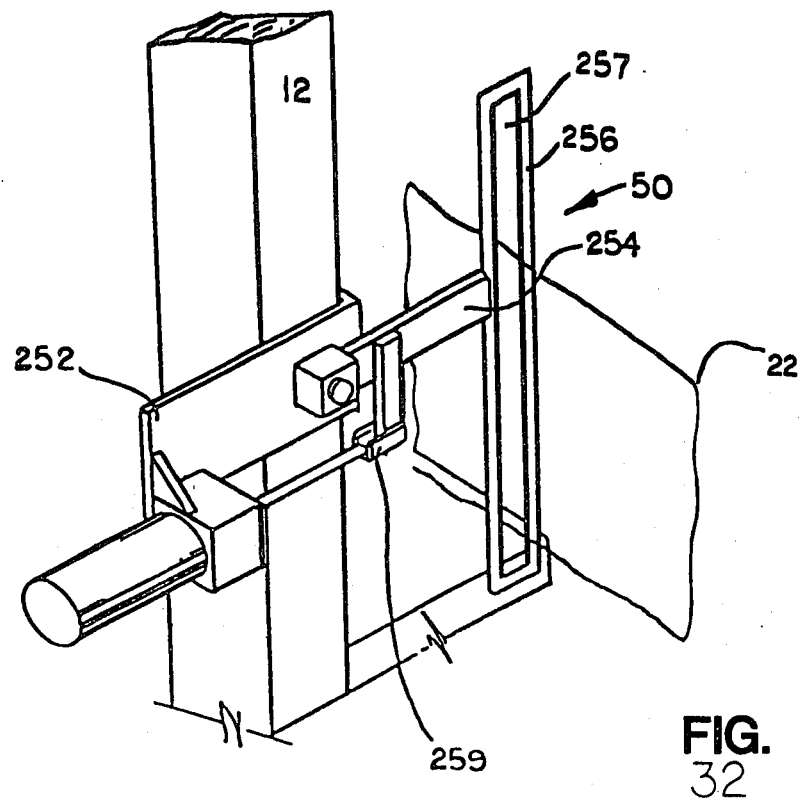
FIG. 32 is a partial perspective view of the roping mechanism of the apparatus when the web is in a full width open position.
Figure 33:
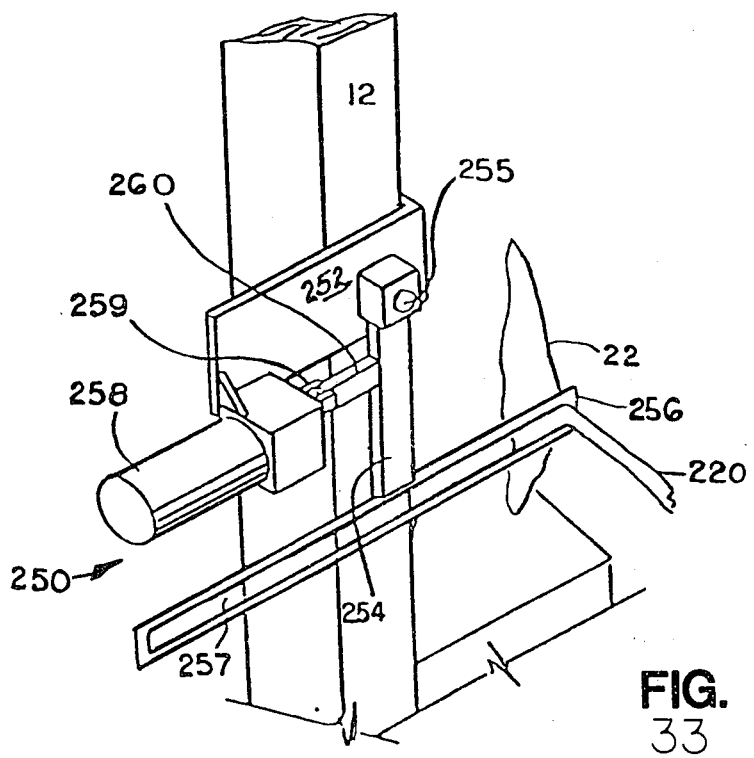
FIG. 33 is a partial perspective view of the roping mechanism when the mechanism is rotated to collapse the web into a rope.

When film loses its tackiness after being stretched beyond the yield point or in other wrapping circumstances, it may be desired to rope and/or tie the film web to complete the package wrap. In such circumstances the unit load is either spiral or full-web wrapped in a conventional manner. Preferably, the film web is roped upstream of the roller system as is shown in FIGS. 32 and 33. However, for certain applications the film web can be roped downstream of the roller system. The roper mechanism 250 comprises a support plate 252 secured to frame 12, and a rotatable support bar 254 having one end rotatably mounted to the support plate, the other end being secured to the web reduction member 256. The web reduction member 256 comprises a rectangular shaped bar which defines a rectangular aperture 257. The length of the rectangular aperture is greater than the width of the web of material used for wrapping the load and the thickness of the rectangular aperture is greater than the thickness of the web. Preferably, it is also equal to the desired thickness of the web when the edges are roped so that when member 256 is rotated, web material 22 is roped into a width substantially equal to the width of aperture 257 as shown in FIG. 33.

A pneumatically activated cylinder 258 is secured to the support plate 252 or the frame and has an end 259 of its piston rod rotatably connected to drive bar 260 which is in turn secured to the rotatable support bar 254. Cylinders 258 can be energized by known fluid circuitry to move the rotatable support bar so that it rotates around the pivot point carrying the web reduction member 256 upward or downward in an approximate 90° arc. This causes the web material to be formed into a roped configuration 500 when the rectangular member is parallel to the ground or alternately allows free flow of the open web through the web reduction member 256 when the web reduction member is positioned substantially perpendicular to ground.

The material web when roped passes through a clamping assembly 170 mounted to the edge of the turntable. It should be noted that turntable clamp 60 is not present when web roping is used.

The clamp assembly 170 comprises a stationary arm mechanism 172 and a rotatable clamp mechanism 174 mounted to a shaft 176 which is rotated by a rotary pneumatic cylinder 178.

The stationary arm mechanism 172 comprises a support block 180 mounted to turntable 308, a seat support 182 secured to the support block 180 and a cylinder support subassembly 184 secured to the support block. The support block has its rear portion 185 secured to the pneumatic cylinder and its forward portion 186 secured to the stationary seat support 182. The seat support 182 has a U-shaped seat 188 with a resilient friction member 190 made of rubber or other suitable resilient material secured in the seat and extending above the legs 200 and 208 of the U-shaped seat 182 for engagement with clamp arm 198 of the rotary clamp mechanism 174. The rotary clamp mechanism 174 comprises a material guide member 192 of an eccentric shape having a circular aperture 194 of suitable diameter surrounding the pneumatic cylinder 178 so that the guide member 192 can freely rotate around the pneumatic cylinder. A curved surface notch 196 is cut inward from the exterior edge of the material guide member 192 a suitable distance which allows the notch to receive and guide the roped material during the tying and severing operation of the apparatus.

The clamp arm 198 is secured to the spacer bar 210 which is secured in turn to the guide member 192. The clamp arm 198 has a cut-away segment 202 which approximates a curved L-shaped surface forming the contact surface for engagement with the resilient member 190. The segment 202 has a planar surface 204 adapted to engage the resilient friction member 190 to hold the roped material therebetween. The outwardly extending leg 206 of the L is adapted to be positioned adjacent the leg 208 of the seat 188 to engage the stretched material at the smallest angle of extension from the wrapped package.

A cutting mechanism 220 and tying mechanism 240 are secured to a movable arm 212 which sequentially moves the mechanisms into the path of the material for the severing and tying steps. The arm 212 is rotatably mounted on support structure 214 and is driven by pneumatic cylinder 216 secured to the frame 222. Extension of the piston arm 217 of cylinder 216 drives the arm and the associated cutting and tying mechanism into the material path so that the mechanism can perform its desired function. Secured to the traversing arm 212 are a perpendicularly extending arm 218 which holds the tying mechanism 240 and a support structure 219 which is mounted to the top of the arm and supports the cutting mechanism 220. The cutting mechanism 220 comprises an upright support plate 222 and traverse brace 224 secured to the support plate and a piston 226 which is secured to the upright support plate 222. A piston arm 227 extends from the piston, the distal end of which is secured to a cutting blade 228. The cutting blade 228 is reciprocally positioned in a guillotine sheath or housing 230, which is secured to the end of the traversing arm 212. The guillotine sheath 230 comprises a plate structure having an inwardly inclined notch 233 cut into one side adapted to receive the roped material and direct it into a center of the notch 234. The trailing end of the roped material is held and carried in cutting notch 234 to a point where it is positioned beside the leading roped end of the wrap held in guide member notch 196 so that both the leading and trailing roped sections of the wrap are severed by reciprocating action of the cutting blade 228.

A standard hog ringer device 242 such as that made by ATRO Company, Types I and C, is secured to the lower part of arm 219. A magazine 244 extends perpendicularly from the mechanism to feed staples or hog rings into the mechanism. In operation of this standard hog ringer, the shaped nose of the hog ring engages the leading and trailing ends of the roped material to be tied together and a ring or staple is driven around the roped material held in the nose of the ring and fastened around the roped sections by bending the ring or staple around the roped sections to be tied. Thus, the two roped web layers which have been placed side by side are fastened together through the action of the hog ring passing a staple around both of the ropes and fastening or tying them together through the contraction or bending of the staple or ring around the materials.

Figure 15:
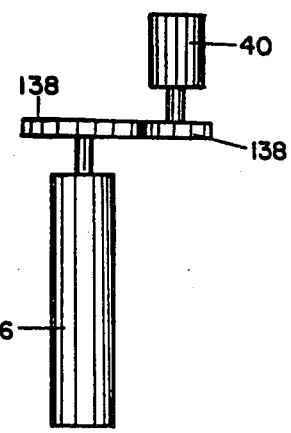
FIG. 15 is an isolated side elevational view of the constant torque device and rollers used in FIG. 13.

An alternate embodiment of the invention is shown in FIG. 15. When the film web leaves the dispenser it is passed around a power assisted roller 36 which is driven by a spur gear 138 of torque device 40 and around an idle roller 75 onto load 200. A turntable clamp assembly 60 holds the leading end of the film web for the initial part of the wrap. Preferably, the entire apparatus is mounted on a moveable carriage for spiral or full web wrapping but it is envisioned that elongation system could be separated from the carriage in certain circumstances. It is apparent that the constant torque device 60 can be utilized between any film stretching assembly if it is positioned downstream of that assembly between the assembly and the load to reduce the force of the film web being applied on the load.

Thus, it can be seen that the process and apparatus for elongating plastic film to overwrap products for containment using a power assisted pre-stretch mechanism with two pulling actions having a mechanical advantage over each other provides a significant improvement over the prior art. The pulling action elongates the film between the two rollers connected to rotate at different speeds and isolates the elongation action from the film roll and the pallet load. The mechanical advantage of the second pulling action over the first allows very high stretching levels to be achieved. The power assisted forces on the film result in some strain recovery because the yield point was exceeded and a significant reduction in film relaxation after stretch was obtained. It should be noted at this point that the yield point is substantially defined by the tensile yield of the stretch film being used. The tensile yield under ASTM Test Method D-882 for Mobil-X film is 980 psi; Mobil-H film, 1000 psi; and Mobil-C film, 1000 psi. The force required to reach the yield point prior to stretching for a given film web is found by the formula:

(cross sectional area × tensil yield)/1 = force at yield point

As an example, the yield point of a 20"×0.009 inch web of Mobil-X film would therefore be 17.6 pounds before it is pre-stretched.

The common tests used to determine tensile yield are the ASTM D-882 and ASTM D-638.

These lower forces placed on the load allow the overwrapping of the product at very high levels of elongation without disruption or crushing forces which would be incurred at equivalent levels of elongation using conventional brake-type film stretch systems.

Figure 21:
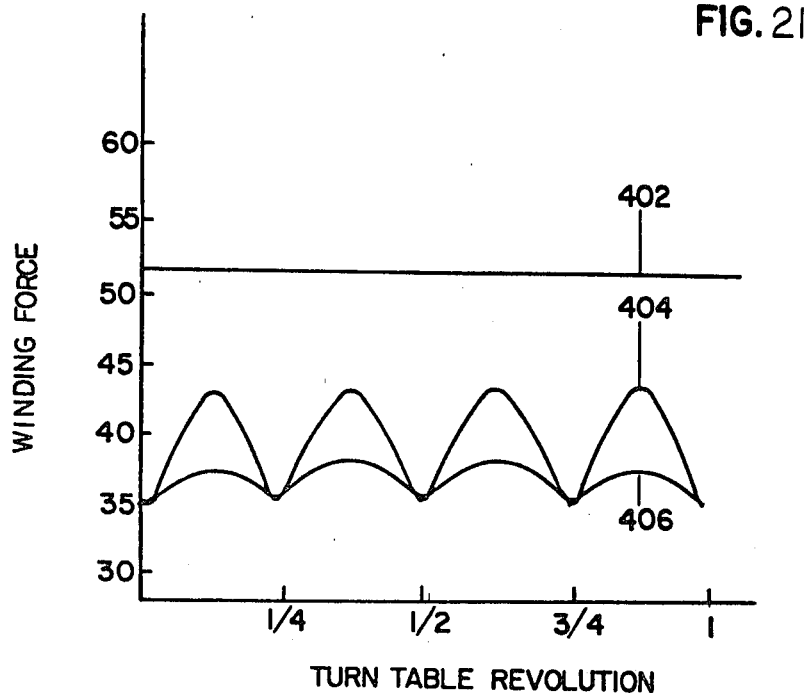
FIG. 21 is a graph of winding force versus angular turntable rotation for the present invention and other embodiments.
Figure 22:
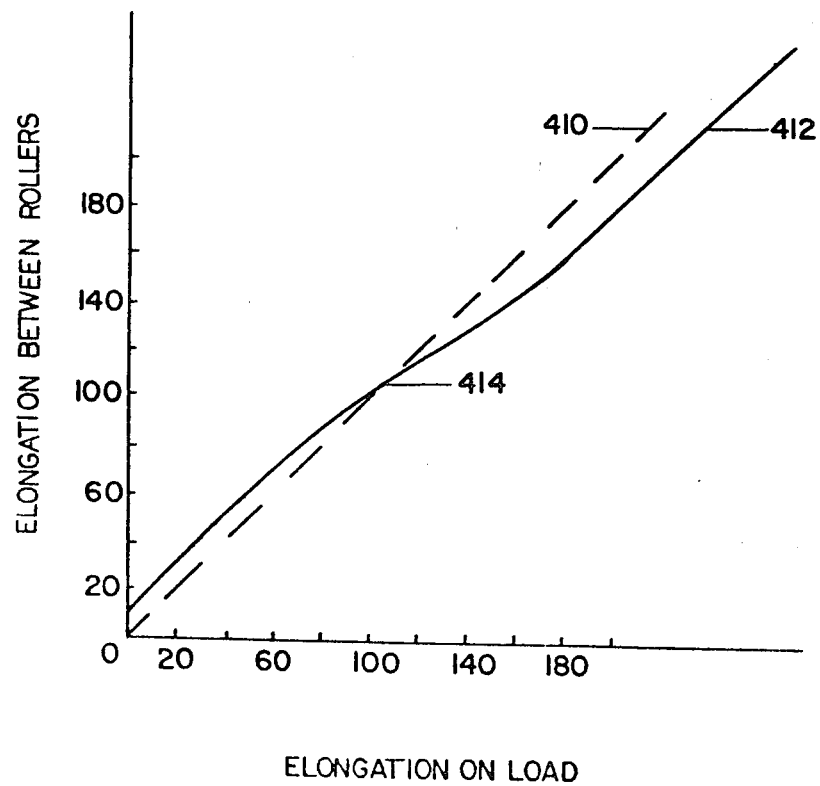
FIG. 22 is a graph of the balance point of elongation between rollers and elongation in the ROLLER STRETCH embodiment.
Figure 23:
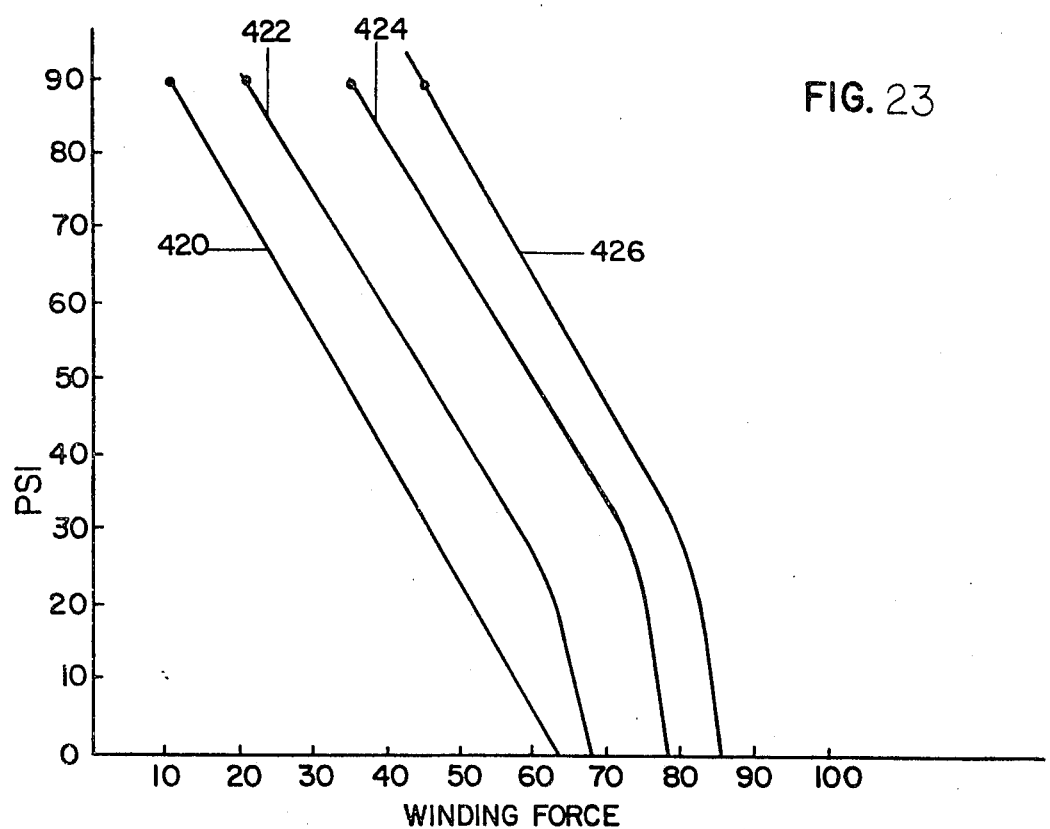
FIG. 23 is a graph of the torque provided by the constant torque device of the invention versus the winding force exerted by the load for a variety of roller speed ratios.
Figure 24:
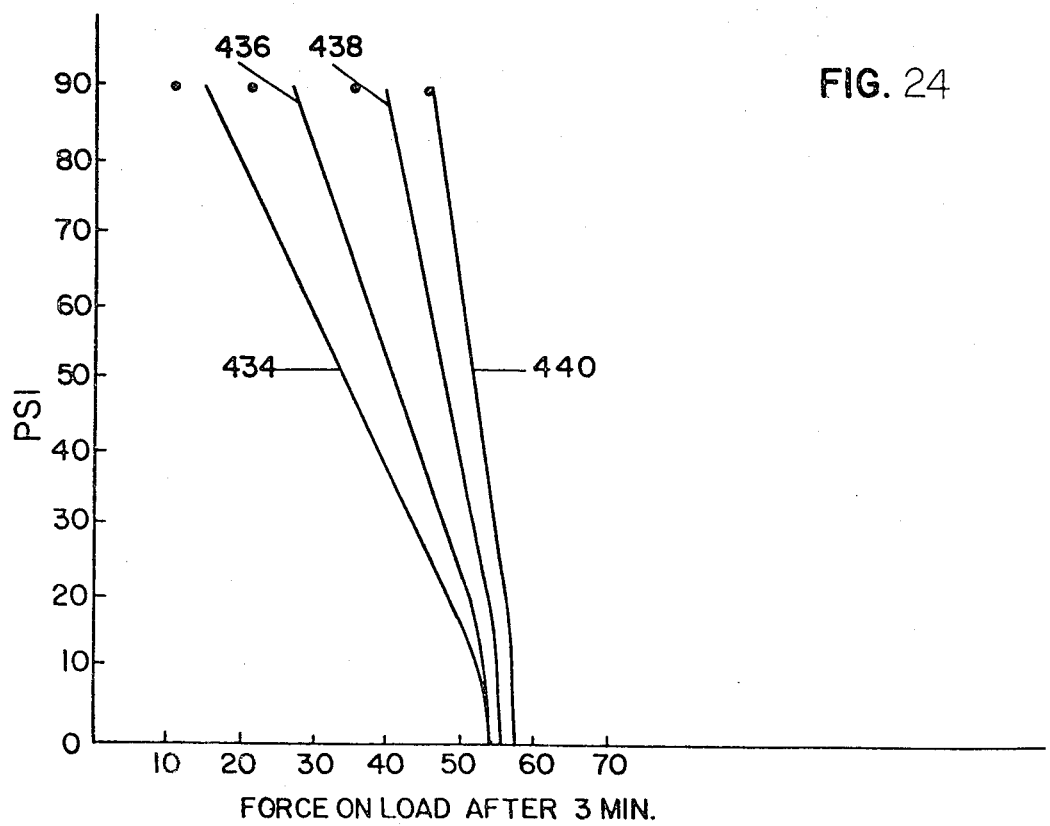
FIG. 24 is a graph of the torque provided by the constant torque device of the invention versus the force on the load after three minutes for a variety of roller speed ratios.
Figure 27:
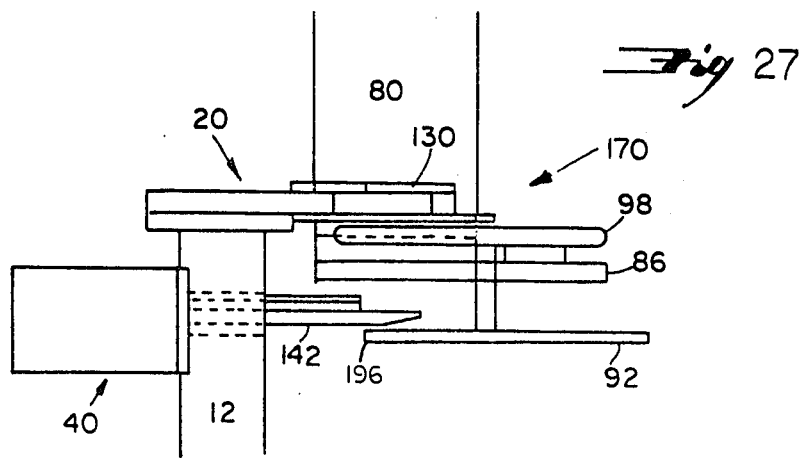
FIG. 27 is an enlarged partial top plan view partially in section of the clamping assembly and tying assembly of FIG. 26.
Figure 28:
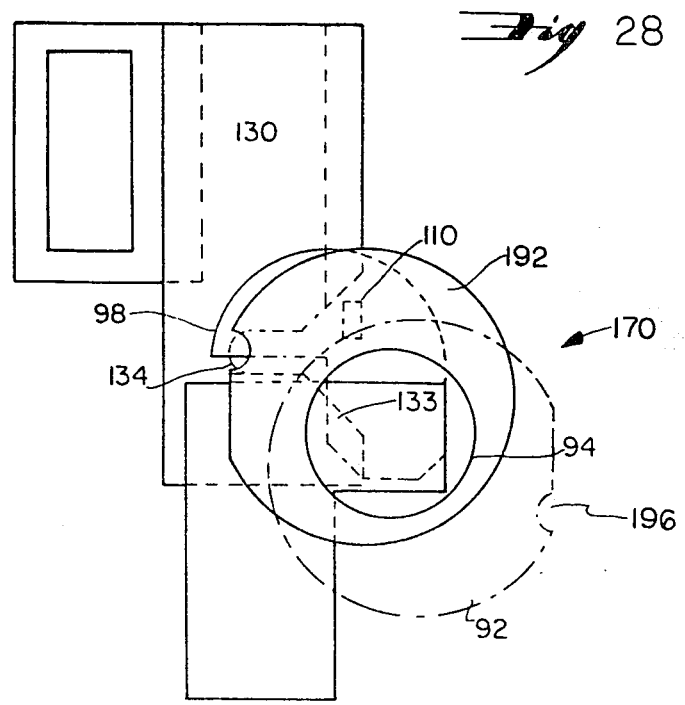
FIG. 28 is a side elevational view of the clamping assembly shown in FIG. 27 showing the position of the clamping assembly when rotated in phantom.

FIGS. 21, 23 and 24 are graphic depictions of the performance advantages obtained by by using the present invention. FIG. 22 depicts the balance point obtained with ROLLER STRETCH which is helpful in understanding the invention. The film used in obtaining the data for the graphs was Mobil-X.

FIG. 21 illustrates the winding force exerted on film pulled by a rectangular load on a rotating turntable as a function of the angular position of the turntable. Curve 402 shows this function for the direct film web drive called ROLLER STRETCH, curve 404 shows the function for the power stretch embodiment, and curve 406 shows the function for the present invention. It is clear that the present invention combines the advantage of minimal variance in winding force as seen in the film drive embodiment with the advantage of lower absolute winding force as seen in the power stretch embodiment.

FIG. 22 illustrates the percentage of elongation between rollers as a function of the percentage of elongation of film applied to the palletized load in the ROLLER STRETCH embodiment. Line 410 is a 45 degree line, that is, one in which the elongation on the Y axis of the graph is precisely equal to the elongation of the X-axis of the graph. Curve 412 shows the actual performance of the film web drive embodiment. Point 414 shows the balance point between the two.

FIG. 23 is a graphic depiction of the amount of power assist contributed by the positive constant torque device 40 as a function of the winding force applied to the palletized load. Each of the four curves shown correspond to a different gear ratio between the rollers 34 and 36. Curve 420 corresponds to a 102.2 gear ratio, curve 422 corresponds to a 140 gear ratio, curve 424 corresponds to a 200 gear ratio, and curve 426 corresponds to a 238.7 gear ratio.

FIG. 24 depicts the amount of power assist provided to the rollers 34 and 36 by constant positive torque device 40 as a function of the force exerted on the load. It should be noted that the force exerted is the crushing force on the load. It can be easily seen that the power assisted stretch enables film to be placed on a load at relatively low force which significantly increases after the passage of time. Thus, it is apparent that film relaxation is mimimal. The four curves portrayed correspond as in FIG. 23 to differing gear ratios between rollers 34 and 36. Curve 434 corresponds to a 102.2 gear ratio, curve 436 corresponds to a 140 gear ratio, curve 438 corresponds to a 200 gear ratio and curve 440 corresponds to a 238.7 gear ratio.

Commercial pallet loads differ significantly from those loads which are utilized by film companies in order to determine the laboratory stretch characteristics of their film. Real film wrapping applications are commercially applied to three different load configurations which are designated for convenience, into load profiles A, B and C. The A load profile is a substantially smooth surfaced load which has no puncture hazards and fits on or overhangs the pallet. The test profile of the A load is 36 inches×36 inches frame with a nominal 2 to 4 inch board extension on one corner of one inch. The B load profile is an irregular shaped load with a puncture hazard up to three inches. The test profile of the B load is a 36 inch×36 inch frame with a nominal 2 to 4 inch board extension on opposite corners of 2 to 3 inches. The C load profile is a random shaped load with a puncture hazard of over three inches. The test profile of the C load is a 36 inch×36 inch frame with nominal 2 to 4 inch board extension on opposite corners of 4 inches and 5 inches.

Figure 25:
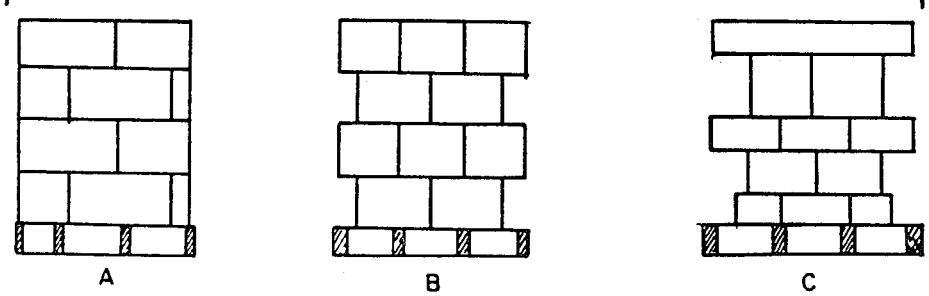
FIG. 25 is a front elevational view of a composite of three loads types A, B and C.
Figure 16:
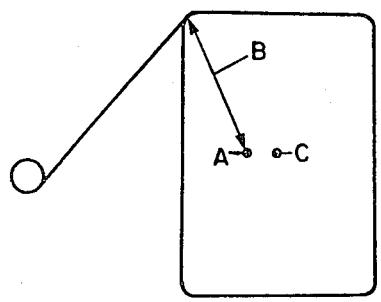
FIG. 16 is an isolated top plan view of a palletized load at the beginning of the wrap cycle in a stretch wrapping apparatus.
Figure 19:
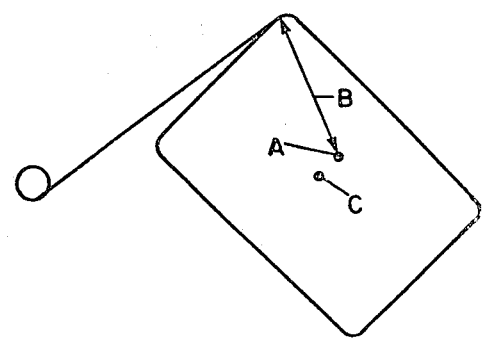
FIG. 19 shows the palletized load of FIG. 16 rotated through an angle of 135 degrees.
Figure 17:
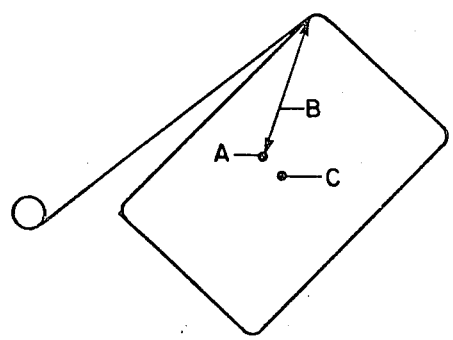
FIG. 17 shows the palletized load of FIG. 16 rotated through an angle of 45 degrees.
Figure 20:
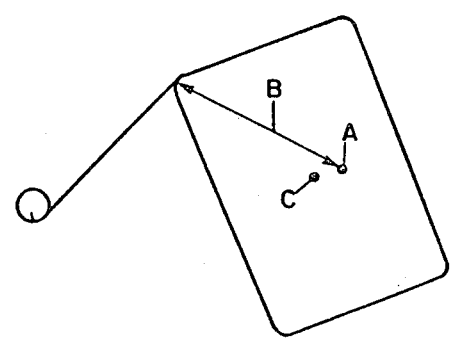
FIG. 20 shows the palletized load of FIG. 16 rotated through an angle of 160 degrees.
Figure 18:
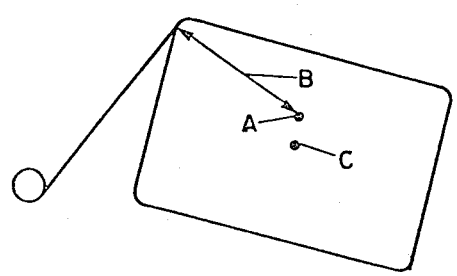
FIG. 18 shows the palletized load of FIG. 16 rotated through an angle of 100 degrees.

Because of the tear characteristics of the film, it can be seen that different film types can be applied to different load profiles at various percentages of stretch. A measure of how much a given film may be stretched over a given load is determined by the film's elasticity, tear resistance, puncture resistance and consistency. In this regard, it should be generally noted that the type A load profile can utilize films of the highest percentage of stretch with the B profile allowing an intermediate amount of stretch and the C type profile having the lowest amount of stretch which can be placed on the load. An example of the three load profiles is shown in FIG. 25. For the purposes of this application, stretch wrapping films have also been characterized into different categories. These categories have been broken down into type 1 films such as linear low density polyethylene; type 2 films such as ethylvinylacetate; polyvinylchloride and cast low density polyethylene, and type 3 films such as blown low density polyethylene. Commercial examples of type 1 films are Bemis ST-80, Mobil-X and Presto SG-4; type 2 films are Consolidated Thermoplastics RS-50, Borden Resinit PS-26 and Mobil-C. Generally speaking, the type 1 films have a higher degree of stretch over all three load profiles with the type 2 films having intermediate stretch over all load profiles, and the type 3 films having the lowest stretch over all load profiles.

A novel inventive packaged load has been developed by using the above noted of method of wrapping. This load utilizes the delayed memory characteristics of film stretched past the yield point so that film within a period of three minutes after it is stretched around a load significantly increases the force on the load thereby holding the load under more compression after it has been wrapped with a looser force. It is thus apparent that one can wrap a load with stretched film with one force and with a passage of time the force will increase placing the load under much more compressive holding power utilizing one of the benefits of shrink wrap. Thus, a novel package is envisioned in which a spiral or full-web wrap is placed around the load at a first lower force with the film then regaining initial memory after having been stretched past its yield point so that the containment force is increased on the load at least 10 percent and having the potential significant post-wrapping conformation through five percent shrinkage. This phenomenon is more readily seen in the graph which is presented as FIG. 24 in combination with FIG. 23.

It should be noted that the steps of the wrapping process can be interchangeable without departing from the scope of the invention. Furthermore, these steps can be interchanged and are equivalent.

In the foregoing description, the invention has been described with reference to a particular preferred embodiment, although it is to be understood that the specific details shown are merely illustrative and the invention may be carried out in other ways without departing from the true spirit and scope of the appended claims.

What is claimed is:

1. A process of making a unitary package by wrapping a plurality of units with a stretched plastic material overwrap forming a unitary load comprising the steps of:
    a. transporting a web of plastic film to a stretching means comprising speed connected roller means partially driven by positive torque means;
    b. elongating the film in the stretching means over its yield point, thereby gaining substantially in strength per cross-sectional area and modulus;
    c. relieving the force on the film web wrapped around the load by applying a positive torque to the speed connected roller means with said positive torque means; and
    d. reducing the variations in force and elongation of the film on the load by substantially controlling the positive torque means to a relatively constant level less than that which is required to elongate the film in said stretching means thereby utilizing the connection of the film to the load partially driving said speed conncted roller means and transmitting speed changes to the positive torque means; and
    e. wrapping said elongated film around the load.

2. A process of wrapping a load encompassing irregular or crushable members with a plastic material comprising the following steps:
    a. pulling a plastic web through a pre-stretch device comprising roller means adapted to rapidly stretch the plastic material over one hundred percent and substantially over its yield point; said pulled plastic web at least partially driving said roller means;
    b. immediately relieving the majority of the stretching force from the plastic material after leaving the pre-stretch device by applying a positive torque to the roller means while transmitting speed changes on the load surfaces back to the roller means to keep a relatively constant force and stretch level;
    c. wrapping the load with stretched plastic material having said majority of stretch force relieved; and
    d. allowing stress and strain recovery of the pre-stretched plastic material to increase load holding forces and conformation of the wrap to load configuration irregularities.

3. A process as claimed in claim 2 wherein said plastic material is rapidly elongated over its yield point between two rollers, spaced apart in a range of ¼ inch to 2 inches.

4. A process as claimed in claim 2 wherein said plastic material is a linear low density polyethylene.

5. A process as claimed in claim 2 wherein said plastic material is a polyvinylchloride.

6. A process as claimed in claim 2 wherein said plastic material is an ethylvinylacetate.

7. A process of making a unitary package by wrapping a plurality of units with a stretched plastic film web overwrap to form a unitary packaged load comprising the steps of:
   a. placing a load having corners on a support;
   b. positioning a roll of stretchable plastic film web on a dispenser means adjacent to said support;
   c. withdrawing a leading edge of said plastic film web from said dispenser means through a plastic film web pre-stretching means;
   d. holding said plastic film web adjacent said load;
   e. stretching said film web above its yield point in said pre-stretching means by relatively rotating the load causing the film web to be pulled past at least two roller surfaces of said stretching means, said roller surfaces being interconnected so that they rotate at different speeds when partially driven by said film web, the downstream roller surface propelling the film web at a faster rate of speed than the upstream roller surface causing the film web to incur substantially all of its elongation between said roller surfaces;
   f. applying a substantially constant positive torque to the interconnected roller surfaces to partially drive and reduce the stretch force from the pre-stretching means to the load to a level below the force required to pre-stretch the film web so that the pre-stretch device speeds up and slows down with the passage of the corner of the load, and
   g. wrapping the load with more than one revolution of the previously elongated film web.

8. A process of making a unitary package by wrapping a plurality of units as claimed in claim 7 including the steps of:
   h. covering the load with wraps of previously elongated plastic material so that the units of the load are held under a compressive force; and
   i. fastening the trailing end of said stretched plastic material to at least one of the previously dispensed wrap layers.

9. A process as claimed in claim 7 wherein said wrapping is a spiral wrap.

10. A process as claimed in claim 7 wherein said wrapping is a full web wrap.

11. A process as claimed in claim 7 wherein said wrapping is a roped material.

12. A process as claimed in claim 7 wherein said wrapping is a tacky material.

13. A process for spirally wrapping a web of stretchable plastic material around a pallet holding a plurality of units to form a unitary packaged load as claimed in claim 7 wherein said pre-stretching means roller surfaces are in an unconnected state during the initial wrapping of the load partially wrapping the load with a web of plastic material which is substantively unstretched, that is, not being stretched over ten percent.

14. The process as claimed in claim 13 wherein the elongation means is unconnected through at least ¼ revolution of the load to place a portion of material on said load that is stretched less than its yield point.

15. The process as claimed in claim 13 wherein the elongation means is unconnected through at least ¼ revolution of the load to place a portion of material on said load that is substantially unstretched.

16. A process of making a unitary package as claimed in claim 7 wherein a substantially constant positive torque assistance is applied to the pre-stretching means to reduce the stretch force at least fifty percent on the film from the pre-stretching means to the load to a level substantially below the force achieved within the pre-stretching means; and the load is wrapped with elongated film whose dwell time between the pre-stretching means and the load is less than one-half second and which travels at a speed of at least 100 linear feet per minute.

17. The process of claim 7 including the step of allowing inelastic recovery to take place in the film between the pre-stretching means and the load, thereby reducing the force required to carry the stretched film between the pre-stretching means and the load.

18. A process of making a unitary package by wrapping a plurality of units with a stretched plastic film web overwrap to form a unitary packaged load comprising the steps of:
   a. placing a load on a support;
   b. positioning a roll of stretchable plastic film web on a dispenser means adjacent to said support;
   c. withdrawing a leading edge of said plastic film web from said dispenser means through a plastic film web pre-stretching means;
   d. holding said plastic film web adjacent said load;
   e. stretching said film web in said pre-stretching means at a first force by relatively rotating the load causing the plastic film web to be pulled past and partially drive at least two roller surfaces of said stretching means, said roller surfaces being connected so that they rotate at different speeds when driven by said film web, the downstream roller surface propelling the film web at a faster rate of speed than the upstream roller surface causing the plastic film web to be substantially elongated over its yield point and incur substantially all of its elongation between said roller surfaces;
   f. pulling the stretched web from the pre-stretching means at a second force less than that of the first force by relatively rotating the pallet causing stretched material to be wrapped around said load; and
   g. applying a substantially constant positive torque to said pre-stretching means at least equal to the difference between said first force and said second force corrected for the friction and mechanical advantage of said pre-stretching means.

* * * * *